United States Patent [19]

Lin

[11] Patent Number: 5,043,930

[45] Date of Patent: Aug. 27, 1991

[54] DIGITAL SIMULATION MODEL FOR FORWARD LOOKING INFRARED (FLIR) SENSORS

[75] Inventor: Tsan H. Lin, Fairfax, Va.

[73] Assignee: United States of America as represented by the Secretary of the Army, Washington, D.C.

[21] Appl. No.: 424,448

[22] Filed: Oct. 20, 1989

[51] Int. Cl.⁵ ............................................. G06F 15/66
[52] U.S. Cl. .................................................... 364/578
[58] Field of Search ............... 364/578, 521, 525, 553, 364/801, 806, 554; 382/42; 356/73.1; 434/43; 358/104

[56] References Cited

U.S. PATENT DOCUMENTS

| | | | |
|---|---|---|---|
| 4,512,745 | 4/1985 | Mohon et al. | 340/723 |
| 4,768,156 | 8/1988 | Whitehouse et al. | 382/42 |
| 4,873,657 | 10/1989 | Kornfeld | 364/578 |
| 4,952,922 | 8/1990 | Griffin et al. | 364/522 |

Primary Examiner—Parshotam S. Lall
Assistant Examiner—Ellis B. Ramirez
Attorney, Agent, or Firm—Milton W. Lee; Anthony T. Lane

[57] ABSTRACT

A forward looking infrared (FLIR) sensor digital simulation model in which the optics modulation transfer function (MTF) is applied to a set of input scene two dimensional digital data in the spatial domain without transferring the data into the frequency domain. The optics are prior to downsampling detectors. A fast Fourier transform (FFT) is performed on the downsampled two dimensional scene map to convert from the spatial domain to the frequency domain. The effects of MTFs on the other components of the FLIR system are simulated and white noise to the detectors is simulated then the scene map has an inverse FFT performed thereon to convert back to the spatial domain for display to an observer.

3 Claims, 5 Drawing Sheets

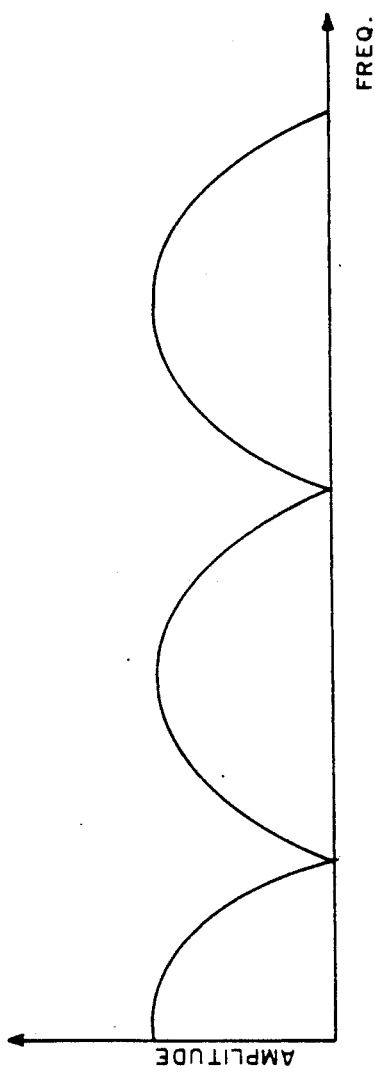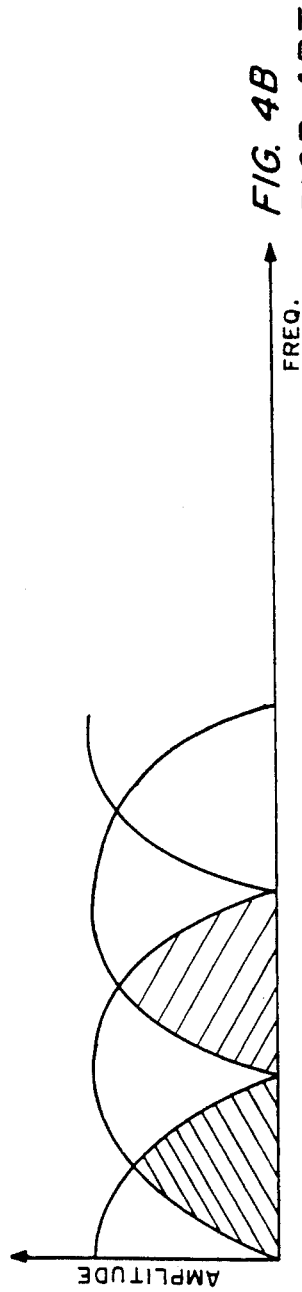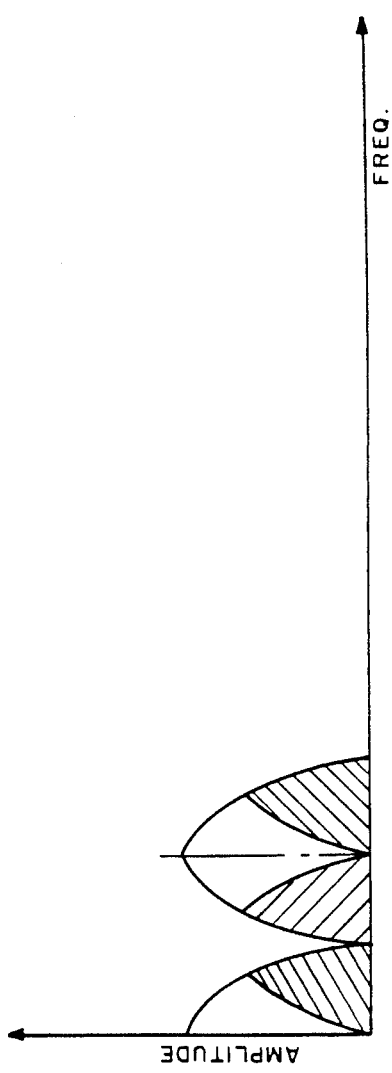

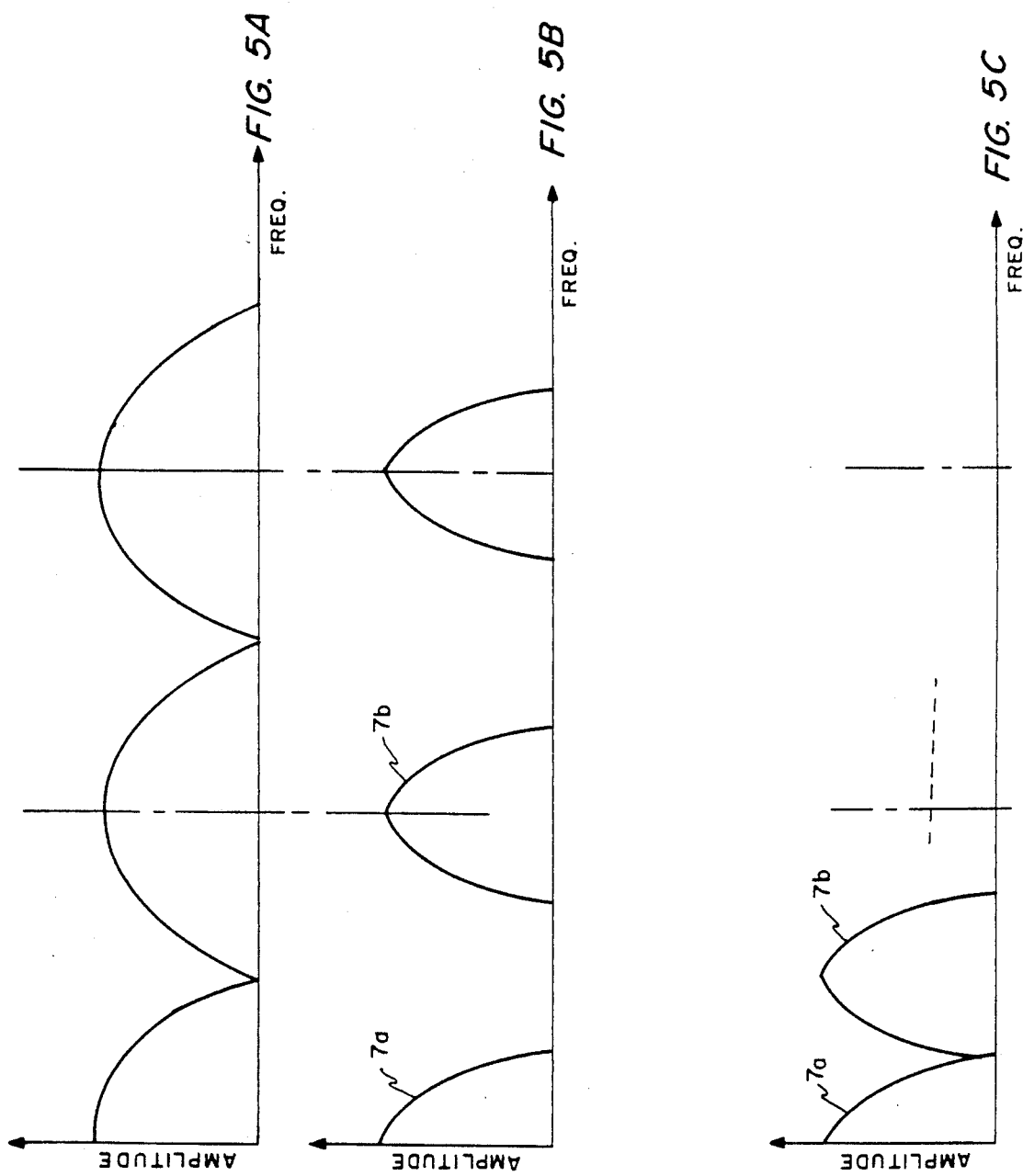

DIGITAL SIMULATION MODEL FOR FORWARD LOOKING INFRARED (FLIR) SENSORS

The invention described herein may be manufactured, used, and licensed by the U.S. Government for governmental purposes without the payment of any royalties thereon.

BACKGROUND OF INVENTION

1. Field

The present invention is a fast acting digital simulation model of sampled data in a two-dimensional input scene to simulate forward looking infrared (FLIR) sensors wherein the optical modulation transfer function of the FLIR is determined in the spatial domain rather than the frequency domain.

2. Prior Art

In the part, the FLIR systems have been modeled, i.e. simulated, with a mathematical equation for the FLIR system performance analysis. The most popular model is the U.S. Army night vision laboratory static performance model for a thermal viewing system, herein called the night vision model. However, this model is for a one dimensional analog FLIR system only. However, a two-dimensional digital simulation has a more stringent requirement than by one-dimensional analog. For example, sampling in these digital FLIR systems causes aliasing problems when the optics are after the down sampled two dimensional input. A new trend has developed to use image processors as a means for modeling the two dimensional digital FLIR system wherein an operator may use a workstation, i.e. a keyboard and a cathode ray tube (CRT), of the image processor to provide not only numerical values but pictorial representations of a simulated FLIR sensor.

The input image data from a two-dimensional simulation is usually very large, typically 1024×1024 pixels or higher. The prior art simulation used a fast Fourier transform (FFT) operation on this large amount of input image data to transform the data from the two dimensional spatial domain to the frequency spectrum domain which is usually used for determining the optics modulation transfer function (MTF) and then applying an inverse FFT to convert the image data from the frequency domain back to the spatial domain. These FFT and FFT processes require an intense calculation process which consumes most of the central processor units (CPU's) time. The time required is typically about 45 minutes for a 512×512 pixel image display, an excessive amount of time for an operator to wait for an observation of the optics MTF. The present invention discloses a simulation of a FLIR sensor which does not use the time consuming FFT and inverse FFT operations but instead determines the optics MTF in the spatial domain and has an output therefrom in the spatial domain. The optics are also positioned prior to the detector downsampling to avoid aliasing of the input scene signal since the optics have a finite bandwidth which is a much wider bandwidth than the detectors. The optics prefilter the frequency spectrum of the input scene to remove the low amplitude high frequency curves therefrom prior to down sampling. In the prior art simulation, the downsampled frequency spectrum curves overlapped causing the aliasing and thus deterioration of the input scene which highly limited a true assessment of the simulation.

SUMMARY OF THE INVENTION

The present invention discloses an approach in which the unit impulse response is found from the optical MTF specified as a function of frequency. Once the unit impulse response function is found the input image data to the optics can be operated on in the spatial domain without going to the frequency domain and the output data from the optics remain in the spatial domain. This approach is much faster than the fast Fourier transform of the frequency spectrum approach and the accuracy does not suffer. Aliasing is also eliminated by placement of optics prior to downsampling.

The invention si described in greater detail herein below with reference to the drawings.

BRIEF DESCRIPTION OF THE DRAWINGS

FIGS. 4a, 4b, and 4c illustrate the aliasing problems caused by the model of FIG. 1; and FIGS. 5a, 5b, and 5c illustrate the frequency spectrum with optics as a prefilter as illustrated in FIGS. 2 and 3.

DETAILED DESCRIPTION OF THE PREFERRED EMBODIMENT

Figure 1:
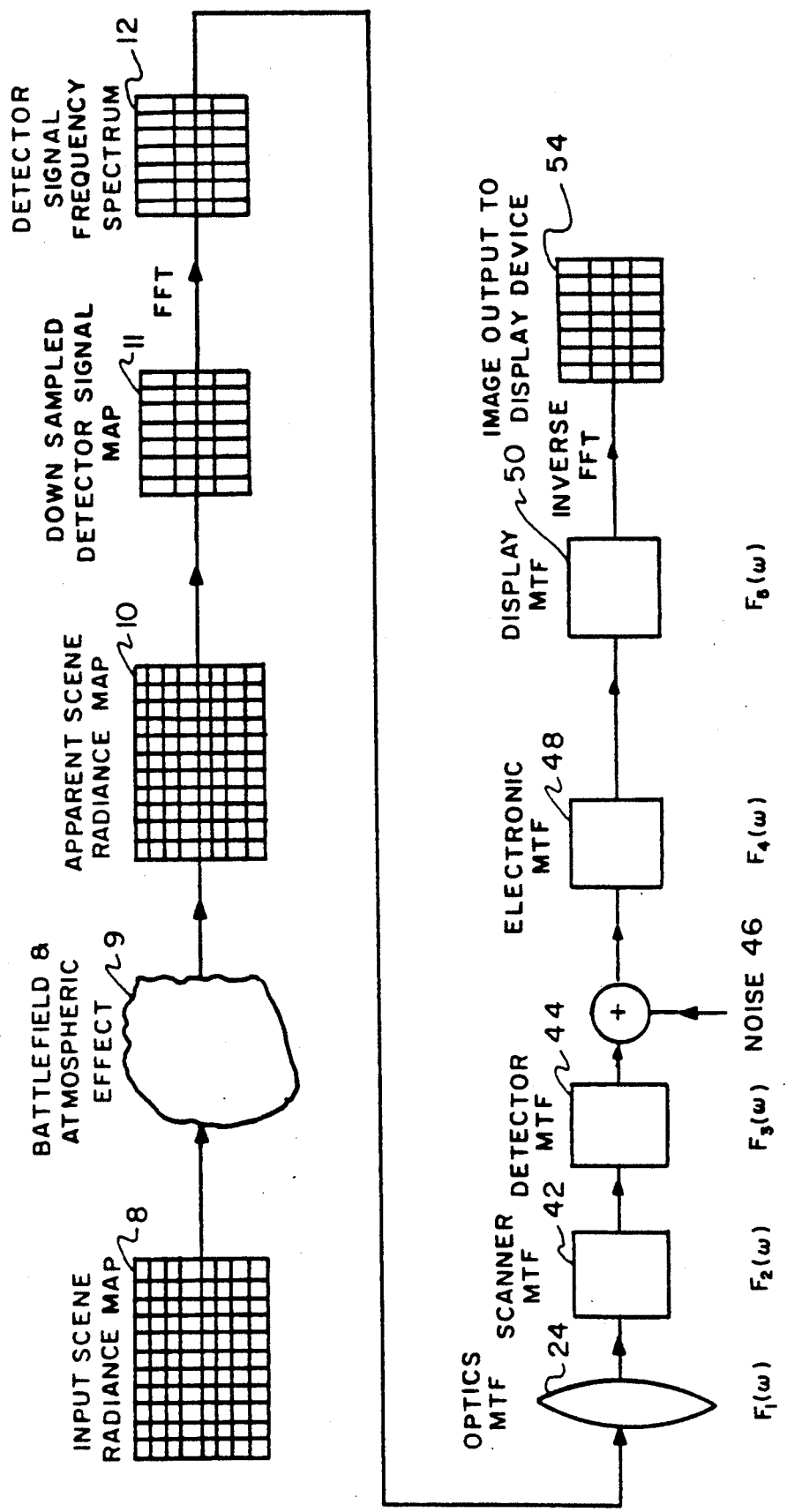
FIG. 1 is a schematic block diagram of a prior art digital simulation model.

Refer to FIG. 1 for the flow diagram and details of the prior art two dimensional digitally sampled simulation of a forward looking infrared (FLIR) system in which the simulated effects of the optics along with the other components as a group, i.e. the MTF is applied as a function of frequency of F1(w) through F5(w) respectively of optics 24, scanner 42, detector 44, electronics 48, and display 50. White noise 46 is simulated and accounts for the induced noise in a FLIR system when the detectors convert the photons to electrical currents. Simulation of the effects of the MTFs applied to all of the components and the white noise is by a computer program in an image processor.

After downsampling into map 11 from an apparent scene map 10, a FET operation converts map 11 into a frequency spectrum map 12 since MTFs are usually applied in the frequency domain. After the MFTs are applied, an inverse FFT is performed to return the two dimensional image map to the spatial domain for display on device 54.

Input scene radiance map 8 may be a digitized image developed from a field test with battlefield and atmospheric effects 9 added to provide an apparent scene map 10. Map 10 is however preferably computer generated to provide a very high resolution input scene data to the FLIR sensor under simulation. The FLIR sensor is comprised of the down sampled detector map 11 through the display device 54. Any degradation of the input scene data at 10, which is a first monitor in a real time simulation, will be shown on the display device 54, or transferred on to display 10 in the improved simulation models illustrated schematically by FIGS. 2 and 3. The data size on map 10 is typically 1024× 1024 pixels or more. This high number may be downsampled into a map 11 which is 512×512 by combining 4 pixels into one pixel. It has been observed that even to process a set of 512×512 pixel image set by applying the FFT, determining the MTF of all components in the frequency domain, and applying IFFT takes about 45 minutes. Further, aliasing is a problem in the prior art since the high frequency spectrum curves of the input scene overlap, which causes deterioration.

The amplitude versus frequency curves of FIGS. 4a, 4b, and 4c should be referred to for illustration of the aliasing signal introduced into the prior art digital simulation model of FIG. 1. The curves of FIG. 4a illustrative the band limited input scene sampling sequence. FIG. 4b illustrates the downsampling frequency spectrum curves wherein the optics 24 are not involved and aliasing begins as shown by hatched lines. FIG. 4c illustrates the frequency spectrum after downsampling with curve overlap retained, and thus aliasing.

Figure 2:
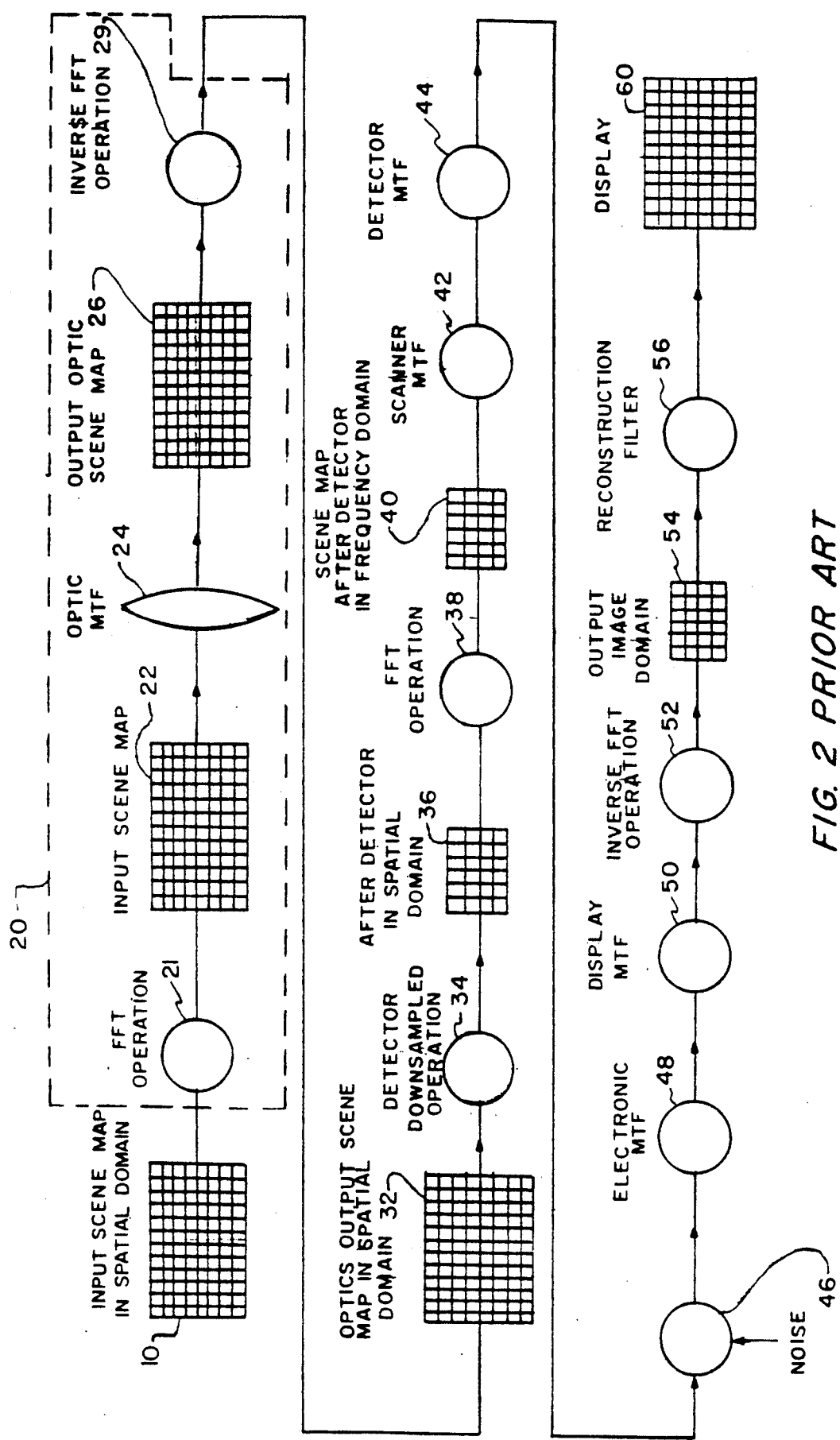
FIG. 2 illustrates a digital simulation scheme in which the optical modulation transfer function is in the frequency domain prior to downsampling.
Figure 3:
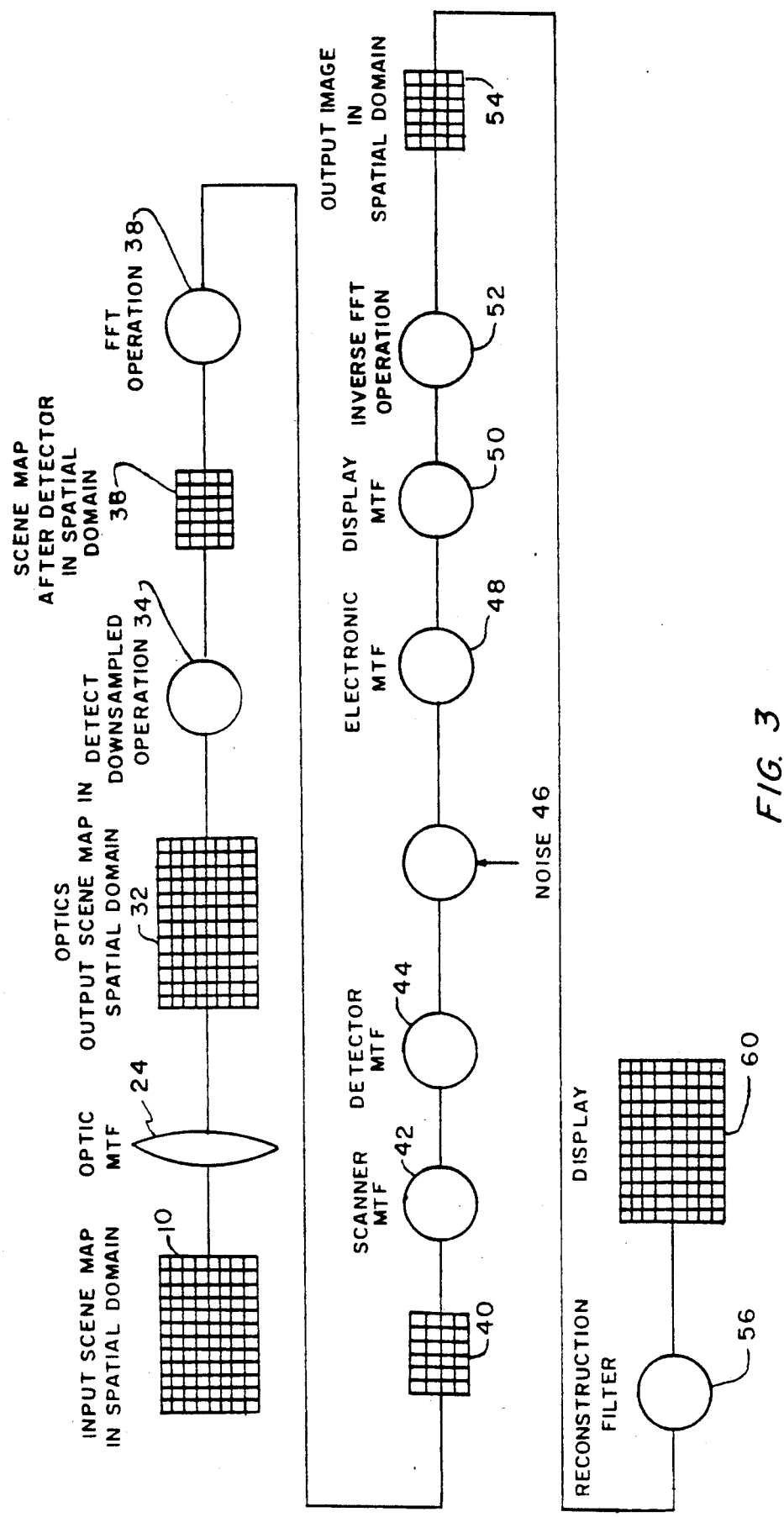
FIG. 3 illustrates the inventive digital simulation model which is an improvement over the prior art scheme of FIG. 2.

Refer now to FIGS. 2, 3, 5a, 5b, and 5c for an explanation of the inventive digital simulation model and method of simulating the FLIR sensor. In the embodiments of FIGS. 2 and 3 the performing a prefiltering optical modulation transfer function (MTF) of an input scene map 10 is done prior to the downsampling of the resulting optics output scene map 32. The optics 24, which has a finite bandwidth, is positioned in front of the downsampled detector 34 to filter out the low amplitude high frequency curves of the sampled data of frequency spectrum of the input scene 10, which input scene frequency spectrum being shown in FIG. 5a and is the same as the frequency spectrum of FIG. 4a. FIG. 5b illustrates the low amplitude high frequency portion of the sampled data, which is between the high amplitude low frequency curves 7a and 7b, is prefiltered out by the optical MTF and thus no overlap or aliasing exists. FIG. 5c illustrates the frequency spectrum after downsampling. The downsampled curves of FIG. 5c represents a frequency shifted one time, i.e. over two pixels in the horizontal and over two pixels in the vertical, since the FLIR sensor system must be simulated for each detector in the detector downsampler 34 to look at more than one simulated input pixel. The simulated input pixels are in the optics outputs scene map 32 in the spatial domain which is converted from the input scene map 10 in the spatial domain by optic MTF 24.

FIG. 2 illustrates an optic MTF in the frequency domain prior to downsampling. This model, even through eliminating the aliasing problem is still slow because of the frequency conversion portion 20 having the fast Fourier transform (FFT) operation 21 of the map 10 in the spatial domain to convert to map 22 in the frequency domain prior to performing the optics MTF 24 to produce an optics output scene map 26 in the frequency domain and then performing an inverse (FFT) operation 20 on map 26 to produce the optics output scene map 32 in the spatial domain. These FFT and inverse FFT operations are performed on the full pixel image display 10, which as noted above is typically 1024×1024 pixels. These operations are very time consuming.

The detector downsampling of the optics output scene map 32 in the spatial domain by operation 34 produces a scene map 36 in the spatial domain. A FFT operation 38 is performed on map 36 to produce a scene map 40 in the frequency domain. In order to analyzer the quality of the FLIR system, the performance of each component in the system is evaluated and simulated. The performance of these components are usually measured by MTF and are multiplied together in the present simulation method. The MTFs are applied in the frequency domain, which requires the FFT operation 38 to convert map 36 from the spatial domain to the map 40 in the frequency domain before the MTFs are applied. The components upon which the MTFs are applied and which are respectively represented by functions F2(w) through F5(w) are scanner 42, detector 44, electronic 48 and display postfiltering 50. An inverse FFT operation 52 converts from the frequency domain to an output image 54 in the spatial domain. White noise 46 is added. Noise 46 is really electronic noise, i.e. when detector 42 converts to the photon to electrical currents the white noise is introduced. The effect of this noise is simulated by computer. A reconstruction filter 56 reconstructs the downsampled output image 54 back into the original scene display size of 1024×1024 on display 60. For explanation purposes, let the number of pixel samples, X(n), be 10 in each of the horizontal and vertical directions of map 10, the scene map 36 being downsampled as noted above over two pixels in each of the horizontal and vertical directions resulting in 5 samples in each of the horizontal and vertical directions on map 36, and with reconstruction filter 56 reestablishing 10 samples in each direction as originally sampled. The high resolution map 10 is therefore displayed on display 60, which is the second monitor in the real time simulation, but has the degradation present caused by applying the MTFs and the white noise which was not present on the high resolution input scene data 10 on the first monitor. It can be appreciated that if input scene map 10 has equal or lower resolution than the FLIR sensor, the degradation cannot be seen by an observer.

Look now at FIG. 3 for an explanation of the inventive concept in which simulation of optics MTF is performed in a much faster way in the FLIR sensor modeling method. The frequency conversion portion 20 that was illustrated in FIG. 2 is eliminated and the optics MTF is applied in the spatial domain rather than the frequency domain. The inventive concept is comprised of a digital nonrecursive system in which optics are placed prior to downsampling and that a MTF effect, such as optics, can be applied to a set of digital data, i.e., the input scene data on map 10, without transferring the data into the frequency domain.

Suppose that x(n) represents a set of discrete digital image sequence at map 10 in the spatial domain which is passed through system optic 24 with a characteristic of unit response of h(n). If the output sequence is represented by y(n) at the optics output scene map 32 in the spatial domain then, $$y(n) = \sum_{k=-\infty}^{\infty} h(k)x(n-k) \qquad (1)$$

and assume the input sequence is a sinusoidal signal, then $x(n) = e^{jwn}$ and $$y(n) = \sum_{k=-\infty}^{\infty} h(k)e^{jw(n-k)} = e^{jwn} \sum h(k)e^{-jwk}$$

where $$He^{jw} = \sum_{k=-\infty}^{\infty} h(k)e^{-jwk} \qquad (2)$$

is the frequency response of h(n), and $$y(n) = H(e^{jw})e^{jwn}$$

In the present sampling system $H(e^{jw})$ is a periodical function of w, and can be represented by a Fourier series which represents $H(e^{jw})$ with the Fourier coefficients corresponding to h(n). The relationship between h(n) and $H(e^{jw})$ can be expressed as, $$h(n) \frac{1}{2\pi} \int_{-\pi}^{\pi} H(e^{jw})e^{jwn}dw \quad (3)$$

$$\text{where, } H(e^{jw}) = \sum_{n=\infty}^{\infty} h(n)e^{-jwn}. \quad (4)$$

Equations 3 and 4 prove that once we known the frequency response of the optics 24, h(n) can be found by equation 2. Usually h(n) converges very quickly and relatively few terms are needed. Computation of equation 1 is very fast because it involves only a few operations.

Equations 1 through 4 are algorithms that make the operations shown by FIGS. 3 and 5a-b operate faster. These equations are well known. It is their use in the FLIR simulation that makes them unique. They are used in a computer program of an image processor to find the frequency response of the unit impulse response function, i.e. equation 3, from the optical MTF specified as a function of frequency wherein the image data 10 is operated on in the spatial domain. Equations 3 is first used to find h(n). It is presented herein that ten (10) samples through one cycle, i.e. through 2 be taken of map 10. This number is for illustration purposes only since the sample size may be different. These ten samples are represented as h(o) through h(9). After finding h(0) through h(9) by equation 3, equation 1 is applied to find y(0) through y(9). These y(0) through y(9) in the spatial domain are the same as the y(0) through y(9) in the frequency domain which is recaptured by the inverse FFT operation 29 of FIG. 2, and are found much faster than the FFT and inverse FFT operations as noted above. Therefore the MTFs are measured for the optics at each of the ten samples and the output sequence y(n) is in a two dimensional digital pattern map 32 the same as the input sequence x(n) with the characteristic of unit response h(n) passed through the system therewith. The optics MTFs are normally involved in the frequency response of a system by the following equation, $$H(f) = \text{optical MTF} = (\cos(A) - A(1-A)[ \quad (5)$$

wherein
 A = λF#fx/1,
with
 λ = wavelength,
 F# = optics F#number,
 Fx = spatial frequency, and
 1 = focal length.

A computer program has been designed to compute h(n) based on equations 3 and 4. It is noted that an operator at a workstation, such as a software keyboard and cathode ray tube (CRT) with user friendly text thereon, may manipulate the computer program to simulate characteristics of the FLIR sensor such as the optics, white noise, and degradation of scene resolution by MTF for all of the components of the FLIR sensor.

An important object of the present invention is to allow for FLIR sensor simulation without having to take the FLIR out into a field test area for an observer to view.

I claim:

1. In a sampled-data system a method of simulating a two-dimensional digital simulation model for a forward looking infrared (FLIR) system, the steps comprising:
 providing a high resolution two dimensional input scene data radiance map as a spatial domain input image to said FLIR system;
 placing optics having a finite bandwidth in optical alignment with said input image and directly in front of detectors to perform a prefiltering function to increase the simulation accuracy and applying an optic modulation transfer function to said input image in the spatial domain for producing two dimensional output scene map data in the spatial domain;
 detector downsampling said two dimensional output scene map data to simulate the effect of the detector size and to provide scene map data having a reduced size in the spatial domain;
 performing a fast Fourier transform (FFT) said scene map data to convert said scene map data from spatial domain to frequency domain;
 applying modulation transfer function to the components past said scene map data in the frequency domain wherein said components are comprised of the scanner, the detector, the electronic, and the display postfilter;
 performing an inverse fast Fourier transform (IFFT) on said scene map data to convert said data from the frequency domain back to the output image in the spatial domain;
 reconstructing said spatial domain output image into the input scene map in the spatial domain; and
 displaying said input scene map in the spatial domain after applying MTFs to said optics and then to all other components in said FLIR system simulation model.

2. A method of simulating as set forth in claim 1 wherein the step of applying an optic modulation transfer function is by computer keyboard.

3. A method of simulating as set forth in claim 2 wherein the step of applying an optic modulation transfer function to said components past said scene map data is by computer keyboard.

* * * * *